United States Patent
Clarkson et al.

[11] Patent Number: 5,890,700
[45] Date of Patent: Apr. 6, 1999

[54] GATE VALVE

[75] Inventors: Curtis W. Clarkson, Reno; Nicholas J. Williams, Sparks, both of Nev.

[73] Assignee: The Clarkson Company, Sparks, Nev.

[21] Appl. No.: 902,298

[22] Filed: Jul. 29, 1997

[51] Int. Cl.$^6$ ................................................. F16K 3/02
[52] U.S. Cl. ........................................ 251/327; 251/355
[58] Field of Search .................................... 251/327, 355

[56] References Cited

U.S. PATENT DOCUMENTS

| | | |
|---|---|---|
| 3,000,608 | 9/1961 | Williams . |
| 3,581,728 | 6/1971 | Abraham et al. ................ 251/355 X |
| 4,176,673 | 12/1979 | Connor . |
| 4,535,801 | 8/1985 | Neale . |
| 4,785,844 | 11/1988 | Pankov . |
| 4,881,719 | 11/1989 | Bowman . |
| 4,895,181 | 1/1990 | McKavanagh . |
| 4,909,272 | 3/1990 | Carpentier . |
| 4,938,250 | 7/1990 | Peterson . |
| 5,020,776 | 6/1991 | Owens et al. . |
| 5,137,261 | 8/1992 | Clifford . |
| 5,271,426 | 12/1993 | Clarkson et al. . |
| 5,338,006 | 8/1994 | McCutcheon et al. . |
| 5,413,140 | 5/1995 | Kimpel et al. . |

*Primary Examiner*—John Fox
*Attorney, Agent, or Firm*—Bergert & Bergert

[57] ABSTRACT

A packingless gate valve is disclosed which includes a housing having opposed similar housing halves with primary resilient sleeve units which compressibly engage each other in the valve open condition and engage opposite sides of the gate in the valve closed condition. A secondary resilient seal unit is positioned above the primary sleeve units within the housing and is secured between the housing halves. The secondary seal unit engages the gate during the opening and closing cycles and prevents any discharge seeping between the primary sleeves from leaking to the atmosphere around the gate or on the actuator end of the valve. An enlarged clean out area cast into the housing extends circumferentially around the primary sleeve units in one embodiment so as to provide containment for any discharge during an actuating cycle. The housing is further provided with flush ports in fluid communication with the clean out area to allow controlled draining or flushing of the contained slurry. The gate valve construction of the present invention results in no leakage to the outside when the valve is fully open and no leakage to the outside or past the gate internally when the valve is fully closed.

9 Claims, 5 Drawing Sheets

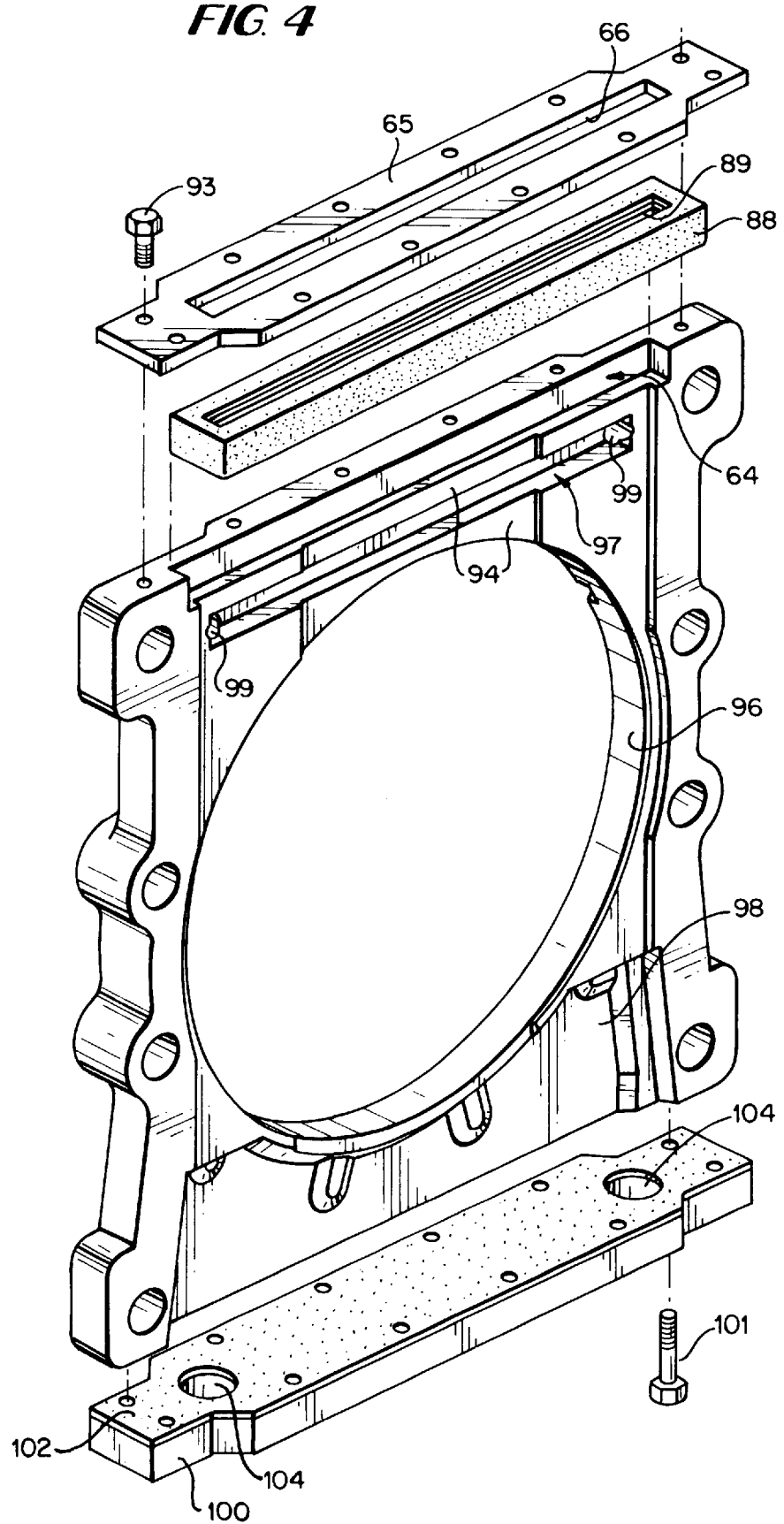

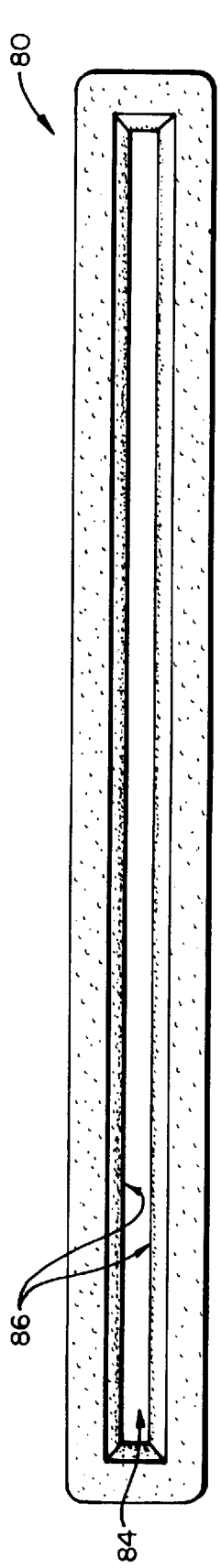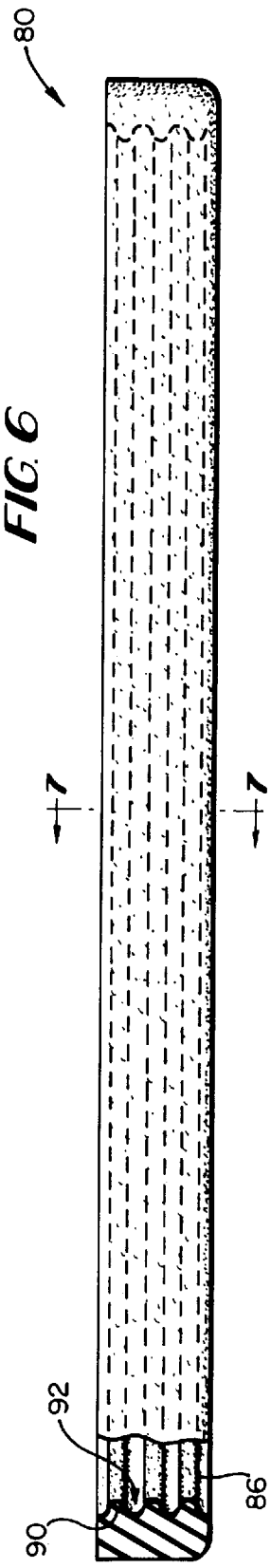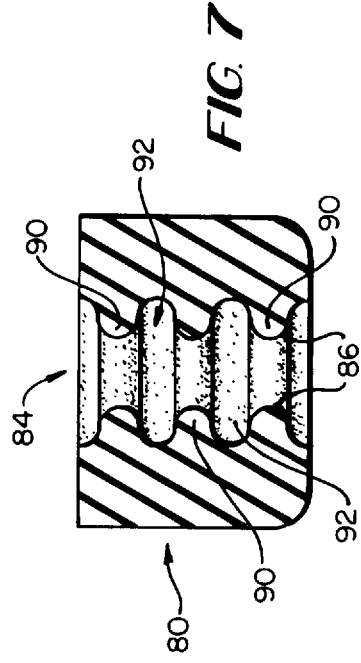

GATE VALVE

BACKGROUND AND SUMMARY OF THE INVENTION

The present invention relates to packingless gate valves and more particularly to gate valves having a specific construction of internal components including elastomer sleeves and a secondary seal which result in improved operation in sealing of the gate. The valves of the present invention are capable of use as knife gate valves and may be used for any of various fluid or dry powder control operations. The gate valves of this invention are particularly well suited for use with abrasive and corrosive slurries.

The present invention is an improvement of the gate valves as described in previous Clarkson patents, including U.S. Pat. Nos. 3,945,604; 4,007,911; 4,257,447; 4,895,181; and 5,271,426.

In accordance with the present invention, an improved construction is provided as compared to the gate valves of previous patents by a special arrangement of a clean out area and also by the use of a secondary seal structure within the valve housing. The secondary seal has a novel coaction with the gate and is mounted in a novel manner in the valve housing.

The present invention employs a valve construction which is based on the resilient seating of elastomer sleeves against a sliding gate. As the gate slides between a pair of primary sealing sleeves during the valve opening or closing operation, the opposing primary sleeves are caused to move axially, coming together and separating respectively. The secondary seal, positioned externally of the primary sleeves, also engages the gate during the valve cycle and acts to prevent any discharge which may seep through the primary sleeves from leaking to the atmosphere around the gate or on the actuator end of the valve. Additionally, an enlarged clean out area is cast into the housing to collect slurry discharge to be flushed out of the valve housing through exit ports in the valve body regardless of the valves installed position.

Accordingly, it is an object of the present invention to provide a novel gate valve assembly wherein a resilient secondary seal unit is mounted in a special manner in the valve housing and has special coaction with the relatively slidable gate, with the secondary seal acting to prevent any slurry discharge from leaking to atmosphere around the gate or on the actuator end of the valve.

A further object of the invention is to provide a novel gate valve assembly wherein the housing is provided with an enlarged clean out area and flush ports to facilitate collection and removal of slurry discharge during an actuating cycle.

Further objects of the invention will be apparent from the following description as taken with the appended claims and the accompanying drawings.

BRIEF DESCRIPTION OF THE DRAWINGS

FIG. 4 is an internal exploded perspective view of a housing member used in association with the embodiment of the gate valve assembly of FIG. 3, shown without the gate or primary sealing sleeve installed.

FIG. 5 is a top plan view of a secondary sealing member in accordance with the present invention.

FIG. 6 is a front elevation in partial cross-section of the secondary sealing member of FIG. 5.

FIG. 7 is a cross-sectional view of the secondary sealing member taken along line 7—7 of FIG. 6.

DESCRIPTION OF THE PREFERRED EMBODIMENTS

Figure 1:
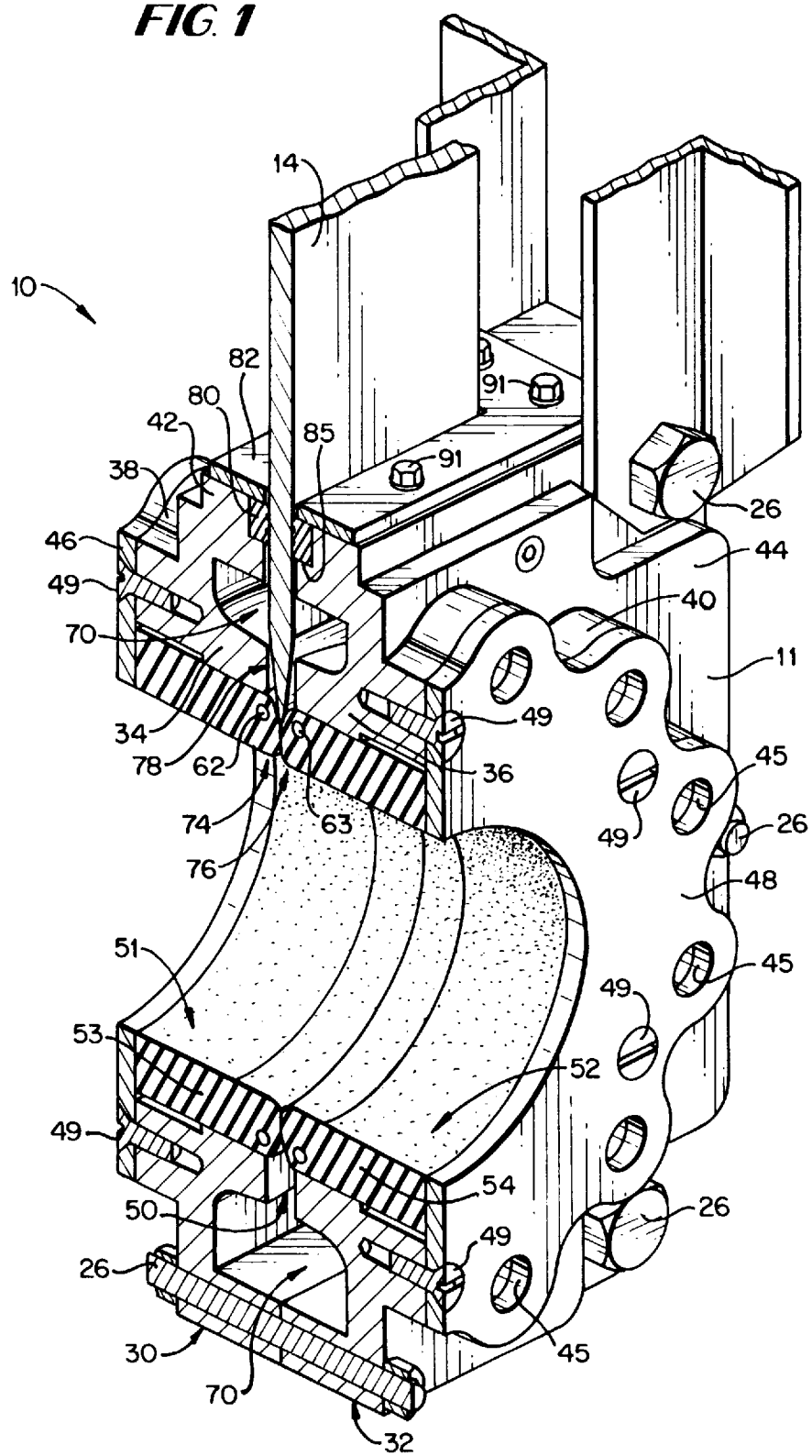
FIG. 1 is a perspective cross-sectional view showing one embodiment of a gate valve assembly according to the present invention.
Figure 2:
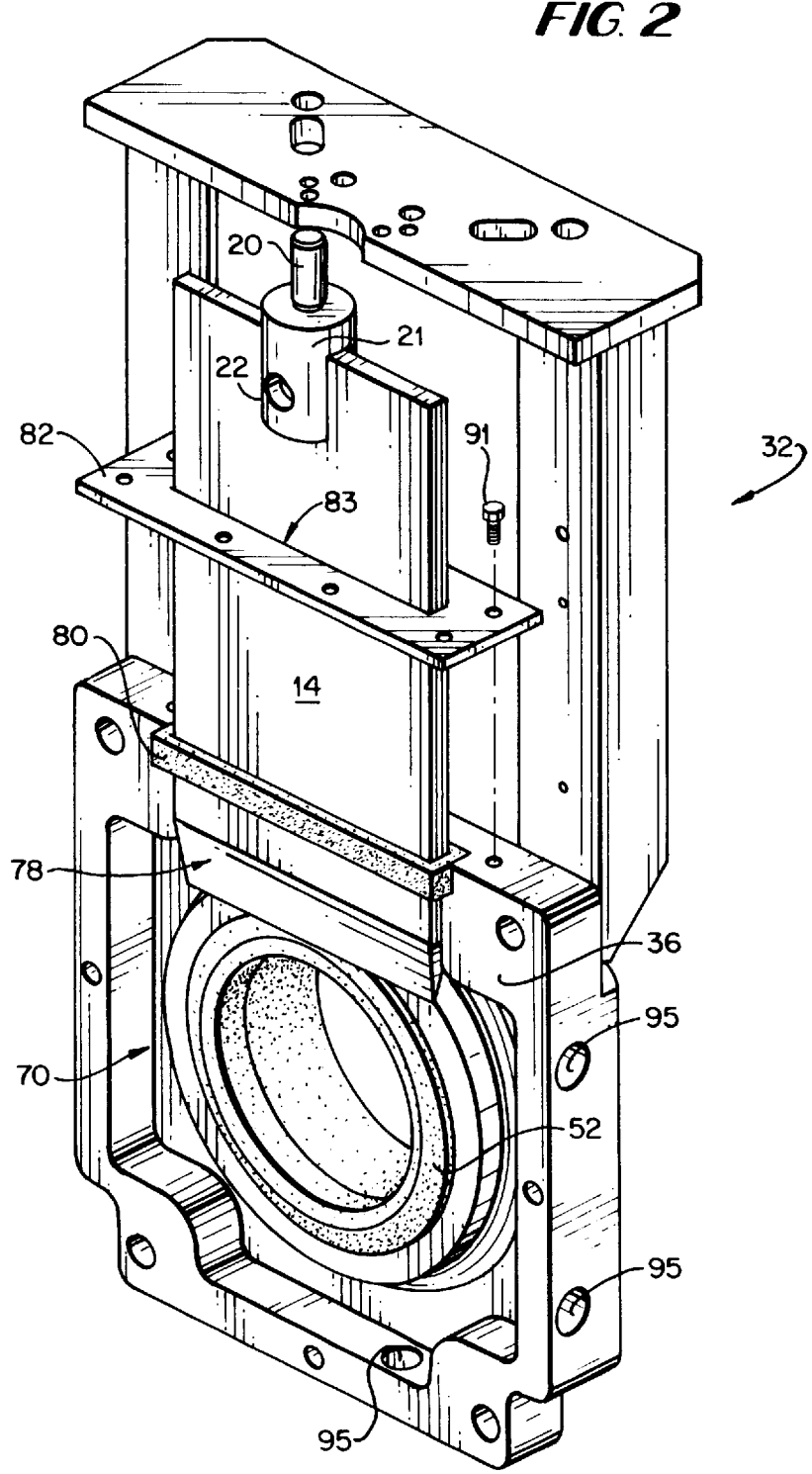
FIG. 2 is an internal perspective view of a housing member used in association with the embodiment of the gate valve assembly of FIG. 1, shown with the gate in the open position.

In the illustrated embodiment of the invention as shown in FIGS. 1 and 2, there is provided a valve assembly 10 which includes a housing 11 adapted to be inserted coaxially into a pipeline.

The movable valve element is in the form of a flat, smooth, imperforate gate plate 14 of uniform thickness mounted for reciprocal movement in and out of the fluid flow path through the housing 11. The gate 14 is shown in the open position in FIGS. 1 and 2. The reciprocal movement of the gate is controlled by a gate actuator mounted on the upper end of the housing 11. The actuator may, for example, be in the form of a piston and cylinder arrangement, with piston rod 20 being provided at the lower end with a bifurcated fitting 21 having holes 22 for insertion of a pill to pivotally mount the piston rod 20 on the upper end of the gate 14. The actuator may also be a handwheel or an electric motor drive. Further description of the actuator and its function are not necessary to an understanding of the invention which relates essentially to the valve structure within the housing and its cooperation with the gate 14.

Housing 11 includes opposed similar halves 30 and 32 having respective housing plates 34 and 36 which include outer generally circular radial flanges 38 and 40 and inner rectangular radial flanges 42 and 44. A separate outer flange member 46, 48 is secured to the outer face of each housing plate 34, 36 by means such as screws 49. Additional bolt holes 45 are shown for use in securing the pipeline companion flanges to the valve. Such a bolt construction contributes to an increase in the operating pressure rating for the valve. The housing halves are rigidly secured together as by a series of bolts 26 extending through the adjacent housing plates. The housing and general operational features are similar to the valve of the above mentioned U.S. Pat. No. 4,895,181 which is incorporated by reference and to which reference is made for further detail. The housing plates 34 and 36 provide a narrow space of sufficient width to pass gate 14 during operation of the valve. This gate passage or chamber space is indicated at 50 in FIG. 1 and is of a fixed width slightly greater than the width of gate 14 when the bolt assemblies 26 are drawn tight except in the central internal region where it opens outwardly to create an enlarged space for clean out purposes, as described hereinafter in greater detail. The housing halves are preferably ductile iron or alloy castings for improved machinability and corrosion resistance.

Primary sealing sleeve units 51 and 52 are mounted in the respective housing halves. Each sleeve unit comprises an annular resilient body 53, 54 of an elastomeric material such as natural rubber or other suitable synthetic elastomer. Each of the sleeves 51, 52 is reinforced at its inner end by an annular shaped stiffener ring 62, 63 which may be formed of a durable material such as steel, hard polyurethane or equivalent plastic. The outer flange members 46 and 48 seal against the axially outer ends of the respective sleeves 51 and 52.

The general configuration, features and functions of the primary sealing sleeves 51, 52 and the stiffener rings 62, 63 in the embodiment shown in FIGS. 1 and 2 are similar to those of the knife gate valve described in the above mentioned U.S. Pat. No. 4,895,181 to which reference is made for further detail.

Figure 3:
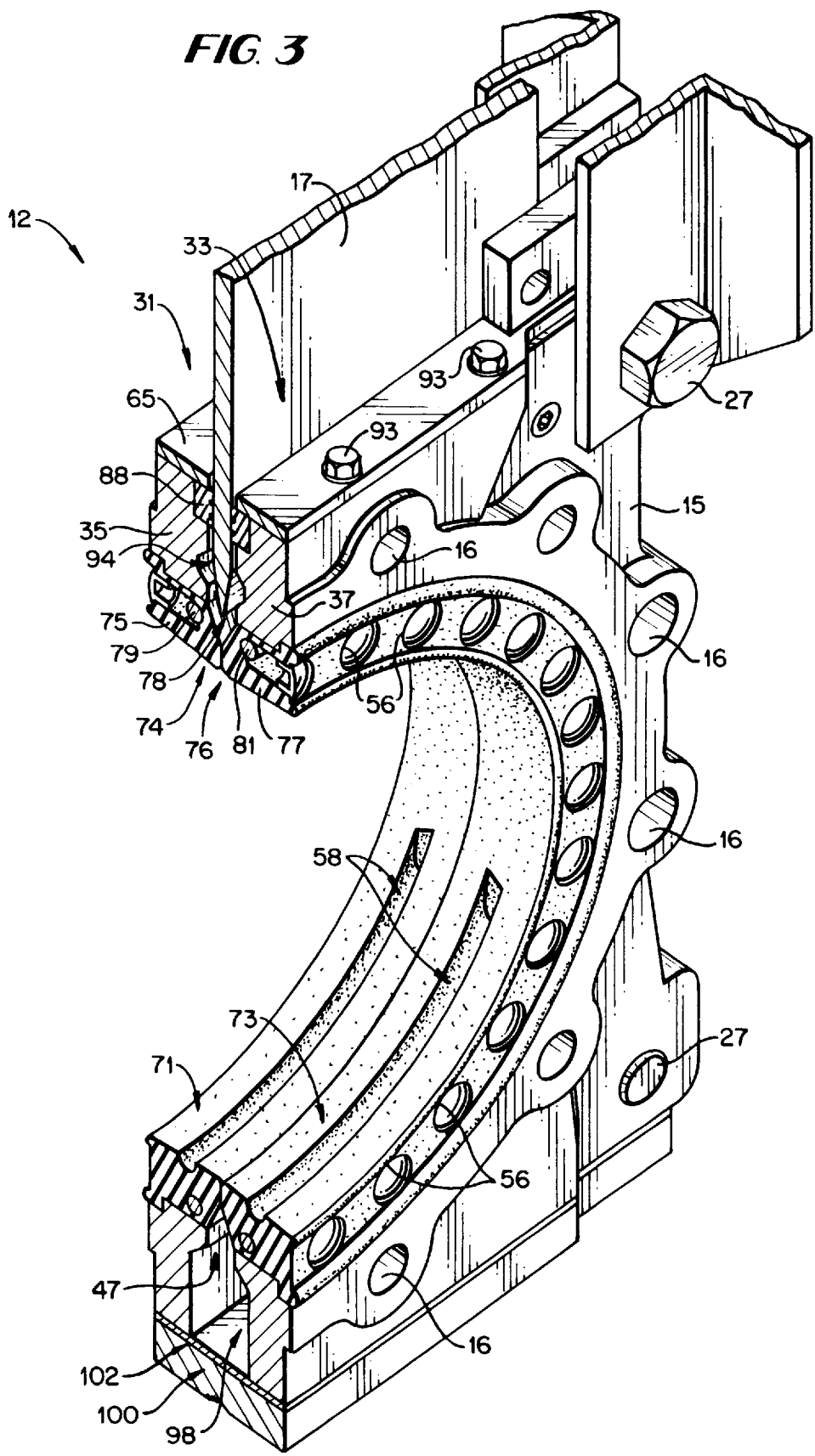
FIG. 3 is a perspective cross-sectional view showing another embodiment of a gate valve assembly of the present invention.

In FIGS. 3 and 4 there is shown an alternative embodiment of the invention, with valve assembly 12 including a housing 15 adapted to be inserted coaxially into a pipeline. Gate 17 is mounted for reciprocal movement by an actuator in and out of the flow path through the housing 15.

Housing 15 includes opposed similar halves 31 and 33 having respective housing plates 35 and 37. The housing halves are rigidly secured together as by a series of bolts 27 extending through the adjacent housing plates. Bolt holes 16 are provided for use in securing the valve in the pipeline. The housing and general operational features are similar to the valve of the above mentioned U.S. Pat. No. 5,271,426 which is incorporated by reference and to which reference is made for further detail. The housing plates 35, 37 provide a narrow space of sufficient width to pass gate 17 during operation of the valve. This gate passage or chamber space is indicated at 47 in FIG. 3 and is of a fixed width slightly greater than the width of gate 17 when the bolt assemblies 27 are drawn tight except at the upper and lower ends where it opens outwardly to create an enlarged space for clean out purposes, as described hereinafter in greater detail.

Primary sealing sleeve units 71 and 73 of this embodiment are mounted in respective housing halves. Each sleeve unit comprises an annual resilient body 75, 77 of an elastomeric material such as natural rubber or other suitable synthetic elastomer such as polyurethane. Each of the sleeves 71, 73 is reinforced at its inner end by an annular shaped stiffener ring 79, 81 which may be formed of a durable material such as steel, hard polyurethane or equivalent plastic. Each sleeve unit 71, 73 has a plurality of compression holes 56 extending axially and arranged at intervals relative to the circumference of the sleeve. These compression holes 56 provide space for the displaced volume of sleeve elastomeric material to flow into during opening and closing of the gate 17. A groove 58 is provided along the inside surface of each sleeve 71, 73 in an arc of approximately 120 degrees extending approximately between the four o'clock and eight o'clock positions. These grooves 58 assist in improving performance during the closing cycle.

The general configuration, features and functions of the primary sealing sleeves 71, 73 and the stiffener rings 79, 81 in the embodiment shown in FIGS. 3 and 4 are similar to those of the knife gate valve described in the above mentioned U.S. Pat. No. 5,271,426 to which reference is made for further detail.

As shown in FIGS. 1 and 2, a secondary resilient seal member 80 is positioned above the primary sleeve units in a secondary sealing slot 85 defined by the mating housing halves. The secondary seal member 80 is a unitary, self-adjusting, deformable body of molded elastomeric material which is uniformly resilient throughout its volume, such as natural rubber or other suitable synthetic elastomer such as polyurethane. Since the secondary seal 80 is a molded elastomer part, the seal construction is different from the braided packing which is normally used to prevent leakage around a knifegate. Thus the present construction is still considered to be packingless.

As shown in FIGS. 5 through 7, the secondary seal 80 has a generally rectangular cross-section and an interior passage 84 to allow for the passage of the gate member. The inner peripheral edge 86 of the secondary seal 80 lines the interior passage 84 and may be provided with ribs or lips 90 and grooves 92. The ribs 90 sealingly engage the entire circumference of the gate. The grooves 92 are capable of retaining a lubricating fluid such as grease, oil, or the like to promote cohesive sliding of the gate during operation. When the lubricating fluid is employed in the grooves 92, the groove and rib configuration allows a small amount of lubricant to be released each time the gate passes through the seal 80. Gate lubrication is advantageously employed to provide smoother gate action and longer seal life as well as to reduce the amount of force necessary to actuate the gate. The secondary seal unit 80 engages the gate 14 during the opening and closing cycles and prevents any slurry which may be discharged between the primary sleeves 51, 52 from leaking to the atmosphere around the gate or on the actuator end of the valve. The secondary seal 80 also prevents any outside contaminants from penetrating inside the primary sleeves 51, 52.

The secondary seal 80 is secured within the housing by a secondary seal retainer plate 82. This plate 82 is shown in FIG. 2 as having been lifted up from the seal 80, in order to show the seal 80 more clearly. The secondary seal retainer plate 82 is secured directly to the housing using bolts 91 or the like and has a throughpassage 83 which aligns with the secondary seal interior passage 84 and the gate chamber to allow full sliding movement of the gate 14. While the primary sleeves 51, 52 prevent direct slurry line pressure on the secondary seal 80, the secondary seal 80 is itself capable of withstanding full slurry line pressure in the event of primary sleeve failure. Since the secondary seal 80 is thus dynamically self-adjusting, there is no need for constant manual adjustment such as in the case of conventional packing in order to stop leakage from the valve.

The embodiment of FIGS. 3 and 4 also includes a secondary seal 88 of a construction similar to seal 80. The secondary seal 88 is positioned in slot 64 and secured by retainer plate 65 with the use of bolts 93. The throughpassage 66 of plate 65 aligns with seal interior passage 89. The secondary seal 88 of this embodiment functions in a similar manner to the seal 80 in the embodiment of FIGS. 1 and 2.

In the embodiment of FIGS. 1 and 2, the lower edge of the gate plate 14 is tapered on both sides to provide a relatively sharp straight knife edge as shown at 78, and initially may extend within clean out area 70, as shown in FIG. 1, but not far enough to appreciably forcibly engage primary sleeve end portions 74 and 76. This is the normal valve open condition of the valve assembly operably mounted in a pipeline, wherein the gate has not yet effectively penetrated the primary sleeve seal. In this position, however, the gate has fully penetrated the secondary seal 80.

Thus, the secondary seal inner peripheral edge 86 is in continual contact with both sides of the gate during the opening and closing cycles.

As shown in FIGS. 1 and 2, the valve housing members 30, 32 are cast so as to provide an enlarged clean out area 70 when mated. The clean out area 70 extends around the entire circumference of the primary sleeve units 51, 52 as shown in FIG. 2 so as to provide containment for any slurry discharge which may escape the primary seal during the opening and closing of the valve. The housing is further provided with one or more flush ports 95 which are in fluid communication with the clean out area 70 to facilitate controlled draining or flushing of the contained slurry.

The gate operating cycle begins in the open position, which is shown in FIGS. 1 and 2. In the closing cycle, the descending gate 14 lower edge enters and forces apart the upper sector of the primary sleeves 51, 52 as it is slidably disposed between primary sleeve end faces and then forces apart the end portions 74 and 76.

The valve moves from an open to a closed position as the gate 14 separates the two primary sleeves 51, 52 that seal against each other when the valve is open. Since the sleeves 51 and 52 are made of a resilient elastomer which is a noncompressible solid, the sleeves 51, 52 must flow out of the way as the gate 14 slides between them, separating the sleeves a distance equal to the thickness of the gate 14. As the gate 14 penetrates further toward the closed position, the seal between sleeve end portions 74 and 76 is progressively parted while the relatively soft sleeve material effectively flows around the knife edge 78. As the gate separates the primary sleeves 51, 52, it blocks the flowing slurry in the pipeline providing tight closure of the valve once the gate has reached its full travel across the port of the valve.

In the final closed valve position, the knife edge 78 has passed the lower sector of the primary sleeves 51, 52 and the gate is disposed between them, while the knife edge projects into the space below. At this time the opposed flat smooth side surfaces of the gate plate 14 are uniformly engaged under compression by the compressed primary sleeve inner end portions 74, 76, which may even be substantially flattened, so that there is a complete annular seal of good radial extent within the valve. At this time the primary sleeve inner end portions 74, 76 are in uniform maximum compression and the internal pressure of the fluid or slurry in the pipeline will further force the upstream primary sleeve inner end into engagement with the gate 14, aided by the inner surface portion of the primary sleeve. The combination of the knife edge and the gate and the soft deformable material of the sleeve inner end portions minimize leakage from the valve during gate closing and opening operations.

In the gate closed condition, the area of the gate 14 that is unsupported is minimized by the present invention so that a maximum pressure rating for the valve can be obtained. During movement of the gate 14 from the closed position to the open position, substantially the reverse of the above described procedure takes place, the resiliency of the seal material maintaining sealing sliding contact between the sleeve inner end portions 74, 76 and the gate 14 until the gate 14 is withdrawn from between the sleeves.

Any slurry which may seep through between the primary sleeves 51, 52 during the gate opening or closing cycles is collected in the clean out area chamber 70 for eventual flushing through the flush port or ports 95. The flush ports 95 may be located at intervals along the bottom and side walls of the housing as shown in FIG. 2 and allow for pipe or hose connection for controlled draining or flushing of the contained slurry. No slurry discharge escapes to the atmosphere outside of the valve and the secondary seal 80 prevents slurry discharge from reaching the actuator end of the valve. In this regard, a most important advantage of the gate valve construction of the present invention is that there is no leakage to the outside when the valve is fully open and no leakage to the outside or past the gate internally when the valve is fully closed. Additionally, the presence of the enlarged clean out area 70 and the secondary seal 80 allows the valve operating pressure rating to be increased.

The valves of the invention are bidirectional or two-way valves; that is, they may control flow in either direction in the pipeline and may be reversed end for end. The primary sleeve units 51, 52 of FIGS. 1 and 2 are essentially identical so that either may be replaced one for the other and function as described above in the assembly. Sleeve units 71, 73 of FIGS. 3 and 4 are also essentially identical so that either may be replaced one for the other. The individual sleeve units are readily removed and replaced when damaged or worn, without having to disassemble the housing assembly.

In the embodiment as shown in FIGS. 3 and 4, there is provided an alternative construction for the clean out area of the gate valve of the present invention. In this embodiment, the upper indented clean out area 94 extends from the slot 64 for the secondary seal 88 at the upper end of the valve to the throughpassage 96 of the housing. A horizontal slot 97 in the wall of the housing is in fluid communication with the clean out area 94. The slot 97 is provided with flush out ports 99 at each end thereof. A lower clean out area 98 is located below the throughpassage 96, with area 98 extending to the bottom of the housing as shown in FIG. 4. The lower clean out area 98 is in fluid communication with the upper clean out area 94.

As shown in FIGS. 3 and 4, a drain plate 100 and a drain plate gasket 102 are secured to the bottom of the housing 11 by bolts 101 so as to form the lower boundary of the lower clean out area 98. Aligned flush ports 104 provided within the drain plate gasket 102 and drain plate 100 allow for pipe or hose connection for controlled draining or flushing of the contained slurry in clean out area 98. The presence of the enlarged clean out area allows the valve to be constructed with a reduced body weight for easier handling while maintaining optimum strength and durability.

The general operation of the gate valve of FIGS. 3 and 4 is as described in U.S. Pat. No. 5,271,426 to which reference is made for further detail.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by Letters Patent is:

1. A gate valve assembly comprising two body housing members having coaxial through passages and being secured together in end to end relation; each of said passages being defined by a housing plate, with means to define a relatively narrow transverse gate chamber, in which a gate member is slidable between a valve open position in which the gate does not block fluid flow through the passages, and a closed position in which the gate is interposed between the passages, a unitary annular primary sealing sleeve unit lining each of said passages and extending the length of each passage whereby each primary sleeve unit has an inner end extending into the chamber and an outer end at a passage end remote from the chamber, and with each of the primary sleeve units having an axially inner end portion extending into the chamber and adapted to sealingly engage each other or the gate under compression in the open position of the valve, and with the gate between the primary sleeve axially inner end portions when the valve is closed, each of the primary sleeve units being in the form of an axially deformable annular body of elastomeric material, and with a secondary sealing unit secured between said housing members above the primary sleeve units, said secondary sealing unit being in the form of a unitary deformable body of elastomeric material having an interior passage which aligns with said gate chamber, said secondary sealing unit further having an inner peripheral edge extending into said interior passage adapted to sealingly engage the gate, said inner peripheral edge being provided with alternating ribs and grooves such that said ribs sealingly engage the gate and said grooves are capable of retaining lubrication to promote cohesive sliding of said gate during opening and closing cycles.

2. The gate valve assembly of claim 1 wherein the secured together housing members define a secondary sealing slot above said primary sleeve units and wherein said secondary seal unit is secured within said secondary sealing slot.

3. The gate valve assembly of claim 2 wherein said secondary seal unit is secured within said secondary sealing slot by a secondary seal retainer plate which engages said secured together housing members, said retainer plate having a throughpassage which aligns with said secondary seal unit interior passage and said gate chamber to allow sliding movement of said gate.

4. The gate valve assembly of claim 1 wherein said secured together housing members define a clean out cavity extending circumferentially around the exterior of the primary sleeve units for collection of slurry discharge.

5. The gate valve assembly of claim 4 wherein at least one of said housing members has a bottom wall, side walls, and at least one flush out port in fluid communication with said clean out cavity through which a cleansing fluid may be flushed into the clean out cavity or through which materials may exit the clean out cavity.

6. The gate valve assembly of claim 5 including a plurality of flush out ports positioned at intervals along the bottom and side walls of said at least one of said housing members.

7. The gate valve assembly of claim 4 further including a drain plate and a drain plate gasket secured to the bottom of said secured together housing members.

8. The gate valve assembly of claim 7 wherein said drain plate and said drain plate gasket are each provided with at least one flush out port which align with one another and are in fluid communication with said clean out cavity so as to allow a cleansing fluid to be flushed into the clean out cavity or to allow materials to exit the clean out cavity.

9. The gate valve assembly of claim 1 wherein said gate is in the form of a knife gate.

* * * * *